(No Model.)
H. HAAK.
GATHERING AND SHIPPING CAN.
No. 323,931. Patented Aug. 11, 1885.
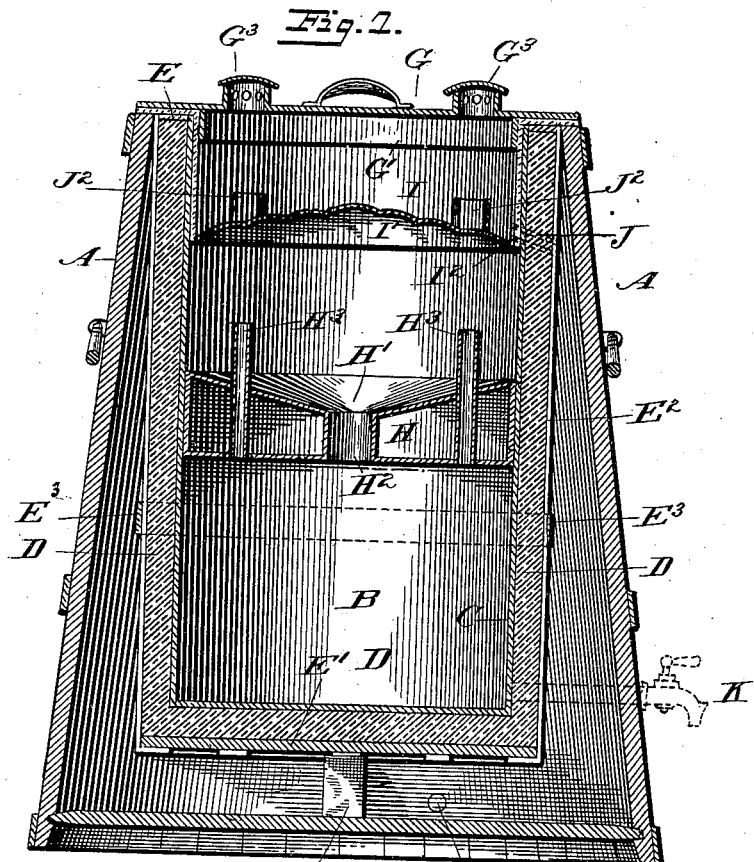
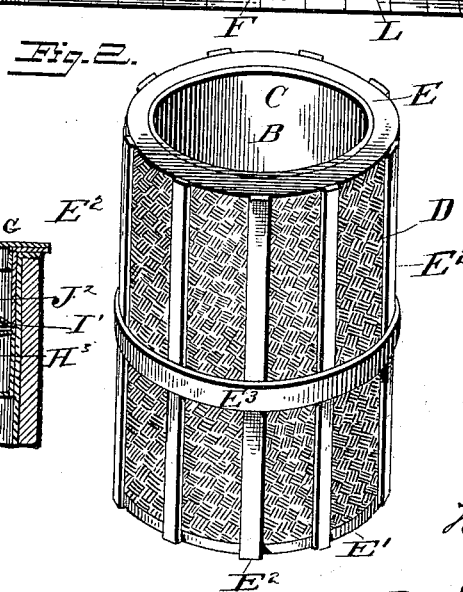
WITNESSES
L. C. Hills
Wm. S. Duvall
Henry Haak
INVENTOR
By E. B. Stocking
Attorney

UNITED STATES PATENT OFFICE.

HENRY HAAK, OF PRESCOTT, PENNSYLVANIA.

GATHERING AND SHIPPING CAN.

SPECIFICATION forming part of Letters Patent No. 323,931, dated August 11, 1885.

Application filed April 17, 1885. (No model.)

*To all whom it may concern:*

Be it known that I, HENRY HAAK, a citizen of the United States, residing at Prescott, in the county of Lebanon and State of Pennsylvania, have invented certain new and useful Improvements in Gathering and Shipping Cans, of which the following is a specification, reference being had to the accompanying drawings.

This invention relates to gathering and shipping cans used by dairymen and others for gathering milk and cream from neighboring farms for use at cheese-factories and creameries, and for shipment of milk and cream to points where it is delivered to consumers. One of the great disadvantages arising from this mode of procuring milk has been that no matter how much care is exercised in cleansing the cans, milk or cream transported therein becomes tainted, and therefore its market value, and that of butter made therefrom, is reduced. Again, where close ordinary cans have been employed, and the milk when put in the can is fresh and warm, naturally the animal heat, odor, and gases generated therefrom, if confined in the can, actually cause the milk to become tainted to a great degree, and very often entirely unfitted for use. To obviate these disadvantages, and to retain the milk or cream in good condition as long as possible, I provide means for maintaining an even temperature and free access of air within the can; and my invention consists in certain features of construction hereinafter described, and particularly pointed out in the claims.

Referring to the drawings, Figure 1 is a central vertical section, and Fig. 2 is a detail in perspective, of my gathering and shipping can. Fig. 3 is a detached view of the float, ice-box, and cover.

Like letters indicate like parts in both figures.

A represents a conical-shaped tub or casing made of ordinary staves held in place by hoops, and on the sides of which are secured suitable handles.

Adapted to fit within the tub or casing A is the milk-receptacle B, which comprises an ordinary sheet-metal can, C, around which is placed a non-conducting substance, D, in this instance asbestus, in quantity or thickness sufficient to perform the required function.

At the top of the cylindrical can C is a wooden or other flange, E, and at the bottom of the can, and extending beyond the same, and flush with the outer surface of the non-conducting substance D is a cylindrical wooden or other disk E'. Around the outer surface of the non-conductor and at intervals is a series of strips, E², their ends being secured to the flange E and disk E'. If desired, and to make the structure still more secure, I may use one or more hoops, E³. Under the can I place one or more ordinary supports, F.

Upon the top of the tub or casing A is a cover, G, which is formed with a depending flange, G', adapted to fit snugly within the can, the edges or rim of said cover extending out flush with the outer surface or sides of the casing A. The cover is provided with a series of ventilators, G³.

Loosely fitting within the can is an air-tight sheet metal cylindrical float, H, the top surface, H', of which is shaped somewhat like an inverted cone or funnel, and is formed with a central opening, H².

To the under surface and extending through the bottom and top and up beyond the upper surface of the float are pipes or vents H³.

I provide an ice-receptacle, I, the bottom of which is preferably raised and corrugated, as at I', which forms a channel around the base, as at I², from which water will be carried off by the downwardly-slanting pipe J into the annular space formed between the conical casing and the straight cylindrical can, thus forming a water-jacket which will greatly facilitate the maintenance of a low and uniform temperature and the preservation of the contents. In case the ice-receptacle is used, and for the purpose of providing access of pipes H³ within the ventilators, I provide in the bottom of the receptacle I upwardly-projecting pipes J², of larger caliber than the pipes H³, which are arranged to register with the same. When it is desired to draw off the milk or cream, it is only necessary to provide a faucet, K. So, also, the waste water in the casing A may be withdrawn by means of the bung or faucet L. The animal heat, odor, and gases will rise and pass out of the pipes H³, and from thence out of the ventilators at the top of the cover, and said gases will be prevented from remaining in contact with the milk by reason of the float H, and the contents will be at a uniform temperature. It will thus be seen that I provide an apparatus which can be made light, strong, and serviceable.

Having described my invention and its operation, what I claim is—

1. The combination of ice-box I, having pipes $J^2$, with float H, having pipes $H^3$, arranged to register with said pipes $J^2$, substantially as specified.

2. The combination of receptacle B, having cover G, provided with ventilators $G^3$, ice-box I, having pipes $J^2$, and float H, having pipes $H^3$, said ventilators and pipes being arranged to register with each other, substantially as specified.

3. The can or receptacle B, having the cylindrical body portion C, the packing of non-conducting material D, the flange E, disk E′, and strips $E^2$, substantially as specified.

4. The combination of the air-tight float having the central opening, $H^2$, and pipes $H^3$, the receptacle B, having the non-conducting packing D, arranged around the same, the flange E, disk E′, strips $E^2$, and cover G, having the ventilator $G^3$, with the outer casing, A, substantially as shown and described.

5. The combination of the receptacle B, having the sheet-metal body portion C, packing D, flange E, disk E′, strips $E^2$, hoop $E^3$, support F, the air-tight float H, having the funnel-shaped top H′, and opening $H^2$, and air-pipes $H^3$, and the outer casing, A, having the cover G and outlets $G^3$, substantially as shown and described.

In testimony whereof I affix my signature in presence of two witnesses.

HENRY HAAK.

Witnesses:
 WM. S. DUVALL,
 PHILIP MAURO.